(12) United States Patent
Govindan et al.

(10) Patent No.: US 8,647,477 B2
(45) Date of Patent: Feb. 11, 2014

(54) HIGH-EFFICIENCY THERMAL-ENERGY-DRIVEN WATER PURIFICATION SYSTEM

(75) Inventors: Prakash N. Govindan, Cambridge, MA (US); Karan H. Mistry, Cambridge, MA (US); John H. Lienhard, Lexington, MA (US); Syed M. Zubair, Dhahran (SA)

(73) Assignees: Massachusetts Institute of Technology, Cambridge, MA (US); King Fahd University of Petroleum and Minerals, Dhahran (SA)

( * ) Notice: Subject to any disclaimer, the term of this patent is extended or adjusted under 35 U.S.C. 154(b) by 444 days.

(21) Appl. No.: 13/028,170

(22) Filed: Feb. 15, 2011

(65) Prior Publication Data
US 2012/0205236 A1    Aug. 16, 2012

(51) Int. Cl.
 *C02F 1/04* (2006.01)
 *B01D 3/34* (2006.01)

(52) U.S. Cl.
 USPC .......... 203/11; 203/24; 203/92; 203/95; 261/117; 95/204; 95/228; 95/231

(58) Field of Classification Search
 USPC ........ 203/10, 11, 22, 24, 91, 92, 95, DIG. 14, 203/DIG. 17, DIG. 20; 159/47.3, 48.2, 159/DIG. 16, DIG. 39; 95/204, 228, 231; 261/171
 See application file for complete search history.

(56) References Cited

U.S. PATENT DOCUMENTS

| | | | | |
|---|---|---|---|---|
| 3,214,351 A | | 10/1965 | Lichtenstein | |
| 3,299,651 A | * | 1/1967 | McGrath | 62/93 |
| 3,345,272 A | * | 10/1967 | Collins | 203/11 |
| 3,440,147 A | * | 4/1969 | Rannenberg | 203/11 |
| 3,468,761 A | * | 9/1969 | Stalcup | 202/173 |
| 3,860,492 A | | 1/1975 | Lowi, Jr. et al. | |
| 4,363,703 A | | 12/1982 | ElDifrawi et al. | |
| 5,168,728 A | * | 12/1992 | Djelouah et al. | 62/532 |

(Continued)

FOREIGN PATENT DOCUMENTS

| | | |
|---|---|---|
| EP | 1443025 A1 | 8/2004 |
| FR | 2 281 896 A1 | 3/1976 |

(Continued)

OTHER PUBLICATIONS

Aly, Narmine H., et al., "Modeling and simulation of steam jet ejectors", Desalination, vol. 123, No. 1, 1-8 (Aug. 30, 1999).

(Continued)

*Primary Examiner* — Nina Bhat
*Assistant Examiner* — Jonathan Miller
(74) *Attorney, Agent, or Firm* — Modern Times Legal; Robert J. Sayre

(57) ABSTRACT

Water can be separated from a liquid composition (e.g., salt water) by directing a carrier gas flow through an evaporator and directly contacting the carrier gas flow with the liquid composition in the evaporator to humidify the carrier gas with water evaporated from the liquid composition, producing a humidified gas flow, which is then compressed by injecting a fluid that includes steam and/or an organic compound at an elevated pressure at least five times greater than the pressure in the evaporator and at a temperature at least as high as a saturation temperature of the steam/organic compound at the elevated pressure of the fluid. After being compressed, the humidified gas flow is directed through at least one condenser where water is condensed from the compressed humidified gas flow and collected; and the dehumidified gas flow is re-circulated back through the evaporator for reuse as the carrier gas.

23 Claims, 5 Drawing Sheets

(56) References Cited

U.S. PATENT DOCUMENTS

| | | | |
|---|---|---|---|
| 5,617,719 | A | 4/1997 | Ginter |
| 6,607,639 | B1 | 8/2003 | Longer |
| 7,037,430 | B2 * | 5/2006 | Donaldson et al. ............ 210/652 |
| 7,225,620 | B2 | 6/2007 | Klausner et al. |
| 7,381,310 | B2 | 6/2008 | Hernandez et al. |
| 7,431,805 | B2 | 10/2008 | Beckman |
| 7,431,806 | B2 | 10/2008 | Levine |
| 7,614,367 | B1 * | 11/2009 | Frick ................................ 122/26 |
| 8,074,458 | B2 * | 12/2011 | Govindan et al. .................. 62/94 |
| 8,252,092 | B2 * | 8/2012 | Govindan et al. ................ 95/211 |
| 8,292,272 | B2 * | 10/2012 | Elsharqawy et al. .......... 261/117 |
| 8,465,006 | B2 * | 6/2013 | Elsharqawy et al. .......... 261/117 |
| 2002/0166758 | A1 | 11/2002 | Vinz |
| 2005/0121304 | A1 | 6/2005 | Beckman |

FOREIGN PATENT DOCUMENTS

| | | |
|---|---|---|
| FR | 2281896 | 3/1976 |
| FR | 2 867 771 A1 | 9/2005 |
| GB | 780272 A | 7/1957 |
| GB | 1 241 174 A | 7/1971 |
| WO | 2004/067451 A1 | 8/2004 |
| WO | WO-2004/067451 A1 | 8/2004 |
| WO | 2011/043945 A1 | 4/2011 |

OTHER PUBLICATIONS

Kronenberg, Gustavo, et al., "Low-temperature distillation processes in single- and dual-purpose plants", Desalination, vol. 136, No. 1-3, 189-197 (May 1, 2001).

European Patent Office, International Search Report and Written Opinion for PCT/US2012/024287 (Apr. 27, 2012).

Muller-Holst, Hendrik "Solar Thermal Desalination Using the Multiple Effect Humidification (MEH) Method", Solar Desalination for the 21st Century 215-222 (2007).

Vlachlogiannis, M., et al., "Desalination by Mechanical Compression of Humid Air", 122 Desalination 35-42 (1999).

KH.Nawayseh, Naser, et al., "Solar desalination based on humidification process—I. Evaluating the heat and mass transfer coefficients", 40 Energy Conversion & Management 1423-1439 (Sep. 1999).

KH. Nawayseh, Naser et al., "Solar desalination based on humidification process—II. Computer simulation", Energy Conversion & Management40 Energy Conversion & Management 1441-1461 (Sep. 1999).

Abu Arabi, Mousa K., et al., "Performance evaluation of desalination processes based on the humidification/dehumidification cycle with different carrier gases", 156 Desalination 281-293 (2003).

Narayan, Prokash G., et al., "The potential of solar-driven humidification-dehumidification desalination for small-scale decentralized water production", 14.4 Renewable and Sustainable Energy Reviews 1187-1201 (Dec. 4, 2009).

Narayan, Prokash G., et al., "Thermodynamic analysis of humidification dehumidification desalination cycles", 16 Desalination and Water Treatment 339-353 (Apr. 2010).

* cited by examiner

HIGH-EFFICIENCY THERMAL-ENERGY-DRIVEN WATER PURIFICATION SYSTEM

BACKGROUND

In this century, the shortage of fresh water may rival or surpass the shortage of energy as a global concern for humanity, and these two challenges are inexorably linked, as explained in the "Special Report on Water" in the 20 May 2010 issue of The Economist. Fresh water is one of the most fundamental needs of humans and other organisms; each human needs to consume a minimum of about two liters per day. The world also faces greater fresh water demands from farming and industrial processes.

The hazards posed by insufficient water supplies are particularly acute. A shortage of fresh water may lead to a variety of crises, including famine, disease, death, forced mass migration, cross-region conflict/war, and collapsed ecosystems. In spite of the criticality of the need for fresh water and the profound consequences of shortages, supplies of fresh water are particularly constrained. It is estimated that 97.5% of the water on Earth is salty, and about 70% of the remainder is locked up as ice (mostly in ice caps and glaciers), leaving only a fraction of all water on Earth as available fresh (non-saline) water.

Moreover, the Earth's water that is fresh and available is not evenly distributed. For example, heavily populated developing countries, such as India and China, have many regions that are subject to scarce supplies. Further still, the supply of fresh water is often seasonally inconsistent. Meanwhile, demands for fresh water are tightening across the globe. Reservoirs are drying up; aquifers are falling; rivers are dying; and glaciers and ice caps are retracting. Rising populations increase demand, as do shifts in farming and increased industrialization. Climate change poses even more threats in many regions. Consequently, the number of people facing water shortages is increasing. Naturally occurring fresh water, however, is typically confined to regional drainage basins; and transport of water is expensive and energy-intensive.

On the other hand, many of the existing processes for producing fresh water from seawater (or to a lesser degree, from brackish water) require massive amounts of energy. Reverse osmosis (RO) is currently the leading desalination technology, but it is energy intensive and still relatively inefficient due to the large pressures required to drive water through membranes and their tendency for fouling. In large-scale plants, the specific electricity required can be as low as 4 kWh/m$^3$ at 30% recovery, compared to the theoretical minimum around 1 kWh/m$^3$, though smaller-scale RO systems (e.g., aboard ships) have much worse efficiency.

Other known systems used in existing seawater desalination systems include thermal-energy-based multi-stage flash (MSF) distillation, which typically also is an energy- and capital-intensive process, and multi-effect distillation (MED). In MSF and MED systems, however, the maximum brine temperature and the maximum temperature of heat input are limited in order to avoid calcium sulphate precipitation which leads to the formation of hard scales on the heat transfer equipment.

Humidification-dehumidification (HDH) desalination systems include an evaporator and a condenser as their main components and use a carrier gas (e.g., air) to communicate energy between the heat source and the brine. In the evaporator, hot seawater comes in direct contact with dry air and this air becomes heated and humidified. In the condenser, the heated and humidified air is brought into (indirect) contact with cold seawater and gets dehumidified, producing pure water and dehumidified air. Some of the present inventors were also named as inventors on the following patent applications that include additional discussion of HDH processes for purifying water: U.S. Pat. No. 8,292,272 B2; and U.S. Pat. No. 8,252,092 B2.

Although the importance of using a low entropic heat source is known in thermal applications, such as power production, use of a high-temperature energy source has not been feasible for seawater desalination until now because of the calcium sulphate fouling problems. In the last decade, the top brine temperature (and correspondingly the heating steam temperature) of thermal desalination systems has been increased from 70-90° C. to 90-120° C. using water softening technology, such as nanofiltration and hybrid systems. Further increase in heating steam temperature (and hence, decrease in total entropy entering the system) using such methods is thought to be unfeasible, however, due to the fouling problems.

SUMMARY

Methods and apparatus for high-efficiency thermal-energy-based water purification are described herein. The methods and apparatus can be used to produce substantially pure water from, e.g., salt water (such as sea water or brackish water) or from waste water, agricultural run-off water, rain water, and groundwater. Various embodiments of the device and method may include some or all of the elements, features and steps described below. For the purpose of providing a consistent and coherent exemplification, much of the discussion that follows is directed to desalination, though the approach can be readily employed in other contexts separating water from other liquid compositions.

Notwithstanding excellent energy recovery in previous multi-stage flash (MSF) and multi-effect distillation (MED) systems, their thermal performance is reduced because the lower temperature of the input heat results in introduction of a higher entropy rate into those systems. As an alternative, the thermal desalination methods and apparatus described herein can be driven using a much-higher-temperature and much-higher-pressure heat input, which is equivalent to heat input with a much lower total specific entropy rate. The methods and apparatus also include methods for advantageously recovering and reusing the energy input to the system, and apparatus therefore, in order to increase the efficiency of water production.

In a method of this disclosure, a flow of a carrier gas is directed through at least one evaporator operated at an evaporator pressure, which can be sub-atmospheric (i.e., less than that of the surrounding external environment). In the evaporator, the carrier gas flow directly contacts a liquid composition to humidify the carrier gas with water evaporated from the liquid composition, producing a humidified gas flow. Next, the humidified gas flow is compressed by injecting a fluid at an elevated pressure at least five times greater than the evaporator pressure. The injected fluid comprises a vapor selected from at least one of steam and an organic compound at a temperature at least as high as a saturation temperature of the vapor at the elevated pressure of the fluid. The compressed and humidified gas flow is then directed through at least one condenser, where the compressed humidified gas flow is dehumidified by condensing water from the compressed humidified gas, and that condensed water is collected. The dehumidified gas flow is then recirculated from the condenser back through the evaporator, where the dehumidified gas is reused as the carrier gas in a closed loop.

Accordingly, in embodiments of a variable-pressure HDH system for water desalination, high-quality heat, at a low specific entropy and a high specific enthalpy, can be input in the form of high-temperature and high-pressure steam [e.g., at a temperature over 120° C. or at least 200° C. and at a pressure of at least 10 bar (1 MPa), and in a particular embodiment, at 300° C. and 30 bar (3 MPa)] at the thermal vapor compressor to compress, heat, and further humidify the moist carrier gas exiting the evaporator. The energy can be used efficiently in the cycle to produce desalinated water, and the energy can be recovered in the form of mechanical work from the dehumidified moist air in an expander. To increase the water vapor content in the carrier gas, the evaporator can be operated under sub-atmospheric pressure conditions. By virtue of the lower total entropy rate of the steam entering the system, the sub-atmospheric operation and the energy recovery in the expander, much higher system efficiencies can be achieved, delivering much higher performance than conventional HDH systems.

The mechanical work recovered from the expander can be used, for example, in an auxiliary water-purification apparatus, such as a reverse osmosis (RO) unit, to further desalinate the brine exiting the HDH system to increase water production and the recovery ratio. This hybrid HDH-RO system can have higher energy efficiencies. The recovered mechanical work can also be reused in a mechanical compressor to compress moist air before or after the thermal compressor.

The methods and apparatus described herein can also improve performance, increasing the temperature and pressure of energy input without exceeding a top brine temperature of 70° C. and by advantageously recovering and reusing the high-quality energy input. In the methods and apparatus, the quality of steam can be increased such that the total entropy rate entering the system is reduced by up to 50%, which can potentially revolutionize the thermal desalination field. Applications of this technology includes desalination of seawater and has wide spread usage in other forms of water purification and extraction as well as for remediation of water-based waste products, e.g., from industrial oil production. The methods and apparatus are also especially applicable to water-and-power coproduction systems. And because embodiments of the system can be operated with lower energy demands than those of other desalination approaches, the system and methods can be powered entirely by an alternative energy source, such as solar panels and solar steam generators (as solar energy is often plentiful in arid regions), and can be operated free of a connection to an external power grid (for the area/region) or in the absence of any available or nearby power grids.

BRIEF DESCRIPTION OF THE DRAWINGS

In the accompanying drawings, like reference characters refer to the same or similar parts throughout the different views. The drawings are not necessarily to scale, emphasis instead being placed upon illustrating particular principles, discussed below.

DETAILED DESCRIPTION

Figure 1:
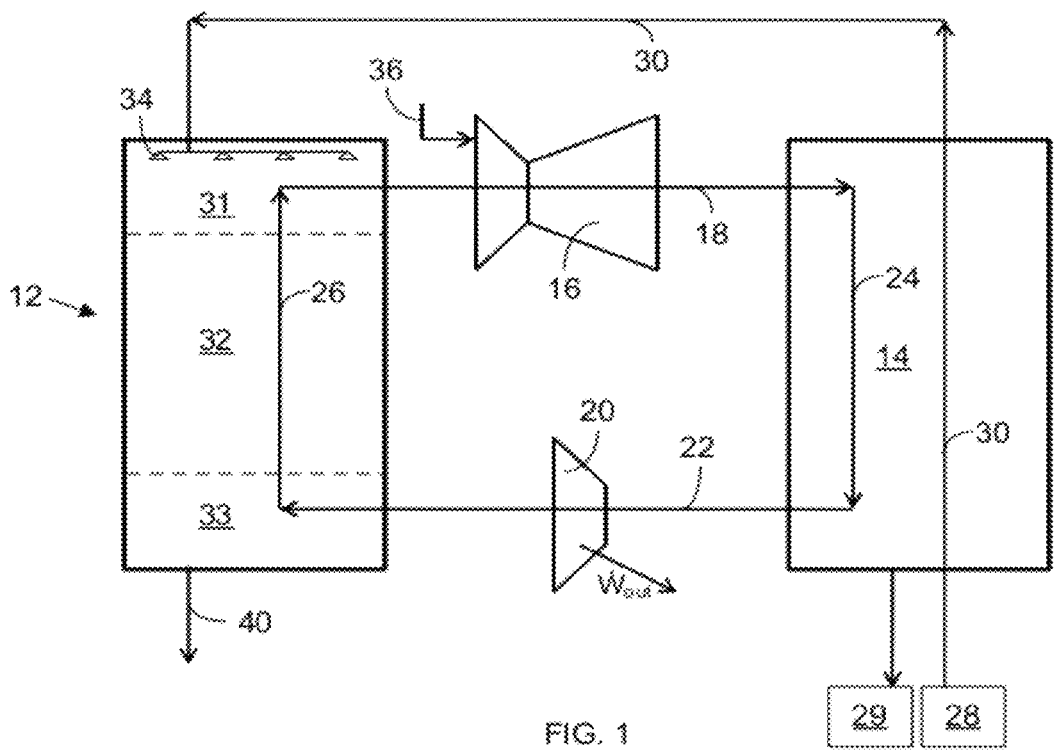
FIG. 1 is a schematic diagram of a high-temperature-and-high-pressure-steam-driven system for humidification-dehumidification (HDH) desalination using a thermal vapor compressor.

The foregoing and other features and advantages of various aspects of the invention(s) will be apparent from the following, more-particular description of various concepts and specific embodiments within the broader bounds of the invention(s). Various aspects of the subject matter introduced above and discussed in greater detail below may be implemented in any of numerous ways, as the subject matter is not limited to any particular manner of implementation. Examples of specific implementations and applications are provided primarily for illustrative purposes.

Unless otherwise defined, used or characterized herein, terms that are used herein (including technical and scientific terms) are to be interpreted as having a meaning that is consistent with their accepted meaning in the context of the relevant art and are not to be interpreted in an idealized or overly formal sense unless expressly so defined herein. For example, if a particular composition is referenced, the composition may be substantially, though not perfectly pure, as practical and imperfect realities may apply; e.g., the potential presence of at least trace impurities (e.g., at less than 1 or 2% by weight or volume) can be understood as being within the scope of the description; likewise, if a particular shape is referenced, the shape is intended to include imperfect variations from ideal shapes, e.g., due to machining tolerances.

Spatially relative terms, such as "above," "upper," "beneath," "below," "lower," and the like, may be used herein for ease of description to describe the relationship of one element to another element, as illustrated in the figures. It will be understood that the spatially relative terms are intended to encompass different orientations of the apparatus in use or operation in addition to the orientation depicted in the figures. For example, if the apparatus in the figures is turned over, elements described as "below" or "beneath" other elements or features would then be oriented "above" the other elements or features. Thus, the exemplary term, "above," may encompass both an orientation of above and below. The apparatus may be otherwise oriented (e.g., rotated 90 degrees or at other orientations) and the spatially relative descriptors used herein interpreted accordingly.

Further still, in this disclosure, when an element is referred to as being "on," "connected to" or "coupled to" another element, it may be directly on, connected or coupled to the other element or intervening elements may be present unless otherwise specified.

The terminology used herein is for the purpose of describing particular embodiments and is not intended to be limiting of exemplary embodiments. As used herein, the singular forms, "a," "an" and "the," are intended to include the plural forms as well, unless the context clearly indicates otherwise. Additionally, the terms, "includes," "including," "comprises" and "comprising," specify the presence of the stated elements or steps but do not preclude the presence or addition of one or more other elements or steps.

An embodiment of a high-temperature-and-high-pressure-steam-driven system for humidification-dehumidification (HDH) water purification using a thermal vapor compressor is illustrated in FIG. 1. This cycle involves the humidification of the carrier gas by water from the liquid composition followed by the dehumidification of the humidified carrier gas to release fresh water. The apparatus includes an evaporator 12 for humidification and a condenser 14 for dehumidification with conduits for the passage of a liquid composition and carrier gas therebetween.

The energy for this cycle is input into the carrier gas after humidification in the evaporator 12 in the form of compression, and the carrier gas is then dehumidified in the condenser 14. The carrier gas after dehumidification can be expanded by an expander 20 to a lower pressure, wherein the expander 20 expands the carrier gas to reduce its pressure and its temperature before it is reintroduced into the evaporator 12.

The separation of the humidification and dehumidification functions into distinct components (i.e., into the evaporator 12 and condenser 14) in the HDH apparatus can reduce thermal inefficiencies and improve overall performance. For example, recovery of the latent heat of condensation in the humidification-dehumidification process is affected in a separate heat exchanger (i.e., the condenser 14) in which the seawater, for example, can be preheated. The HDH process thus can provide high productivity due to the separation of the basic processes.

Using the apparatus and methods described herein, the principle of humidification-dehumidification of a carrier gas can be utilized to separate substantially pure water from a liquid composition. The liquid composition can be in the form of a water-based solution with dissolved components, such as salts, and/or a mixture containing solids and/or other liquids. The process is herein described in the context, for example, of water desalination, where purified water is separated from salt water, though the process and apparatus can likewise be utilized in the context of separating water from other liquid compositions.

In the humidification-dehumidification methods, an inert carrier gas that can hold water vapor (e.g., selected from air, nitrogen, helium, carbon dioxide, argon, hydrogen, etc.) having the ability to carry water vapor is used as the medium for separating substantially pure water from the liquid composition (e.g., seawater, brackish water, etc.). In the embodiment of FIG. 1, the carrier gas is circulated through the evaporator 12 and condenser 14 and therebetween via conduits 18 and 22 in a closed loop.

The evaporator 12 can be filled with a packing material in zone 32 in the form, e.g., of polyvinyl chloride (PVC) packing to facilitate the gas flow and to increase the liquid surface area that is in contact with the carrier gas. The body of the evaporator 12 (and the condenser 14) can be formed, e.g., of stainless steel and is substantially vapor impermeable; seals formed, e.g., of epoxy sealant, gaskets, O-rings, welding or similar techniques, are provided at the carrier gas and water inputs and outputs of the evaporator 12 and at the interfaces of each modular component and adjoining conduits to maintain vacuum in the system. In one embodiment, the evaporator 12 is substantially cylindrical with a height of about 1.5 m and a radius of about 0.25 m.

The evaporator 12 and condenser 14 are both of a modular construction (i.e., each in the form of a separate and discrete device) and are substantially thermally separated from one another. The characterization of the evaporator 12 and condenser 14 as being "substantially thermally separated" is to be understood as being structured for little or no direct conductive thermal energy transfer through the apparatus between the evaporator and condenser, though this characterization does not preclude a mass flow carrying thermal energy (via gas and/or liquid flow) between the chambers. This "substantial thermal separation" characterization thereby distinguishes the apparatus from, e.g., a dewvaporation apparatus, which includes a shared heat-transfer wall between the evaporator and the condenser. In the apparatus of this disclosure, the evaporator and condenser need not share any common walls that would facilitate conductive heat transfer therebetween.

The carrier gas flows upward through the evaporator 12 from the port for conduit 22 to the port for conduit 18. Humidification of the carrier gas is achieved by spraying the liquid composition from one or more nozzles 34 into a spray zone 31 at the top of the evaporator 12 then through a zone 32 including a packing material, where some of the water in the liquid composition will evaporate, while a non-evaporated remnant of the liquid composition flows down through a rain zone 33 to a surface of collected remnant liquid composition in, e.g., a tray at the bottom of the chamber. Meanwhile, the carrier gas moves up through the evaporator 12, as shown by arrow 26, and is brought into contact with the liquid composition, particularly in the bed of packing material, to humidify the carrier gas with water vapor evaporated from the liquid composition. The carrier gas can consequently be saturated with water vapor before being withdrawn from the evaporator 12 via conduit 18.

In conduit 18, the moisture-laden low-pressure carrier gas is then compressed to a higher pressure and higher temperature in the thermal vapor compressor (also referred to as a "thermocompressor") 16 and introduced into the condenser 14, where the water is condensed from the gas via a dehumidification process. The thermal vapor compressor 16 can be, for example, in the form of a steam-jet ejector employing a Venturi with a conduit for steam input 36. In an example of this embodiment, the thermal vapor compressor 16 can compress the carrier gas using saturated steam (e.g., from an associated power plant) at a pressure of 1 to 3 MPa. Optionally, a mechanical compressor can also be included in conduit 18, either upstream or downstream of the thermal vapor compressor 16, to provide additional compression of the carrier gas.

Figure 2:
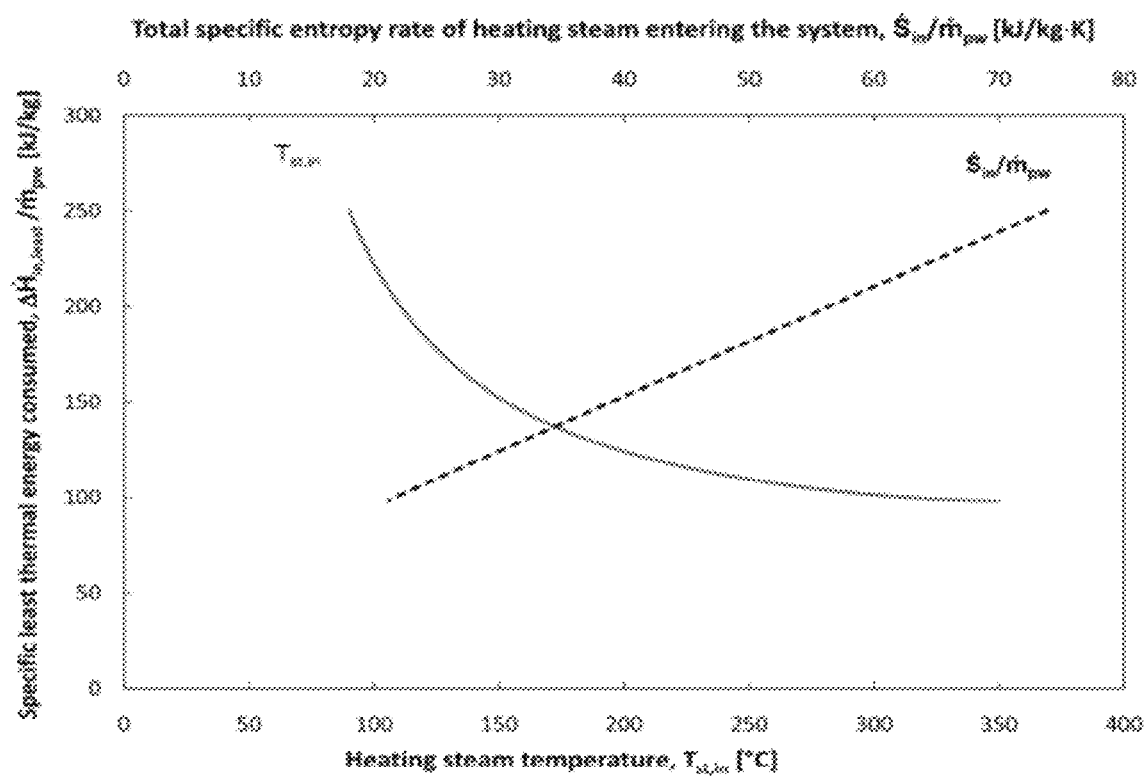
FIG. 2 is a general representation of the least thermal energy required to drive a thermal desalination system as a function of the temperature, $T_{st,in}$, of the steam input to the thermal vapor compressor and as a function of the total specific entropy rate, $\dot{S}_{in}/\dot{m}_{pw}$, of the steam. The calculations here are for a reversible system.

FIG. 2 shows the effect of increasing the heating steam temperature, $T_{st,in}$, (and correspondingly reducing the total specific entropy rate of the steam entering the system) on the least thermal energy required to produce 1 kg/s of water in a thermal water purification system. The total specific entropy rate of the steam entering the system is represented as $\dot{S}_{in}/\dot{m}_{pw}$ [kJ/kg·K], where $\dot{S}_{in}$ is the total entropy rate of the input steam (W/K), and $\dot{m}_{pw}$ is the mass flow rate of the product water. For this illustration, the salinity, $S_1$, of the seawater feed is set at 35,000 ppm; and the temperature, $T_0$, of the seawater feed is set at of 30° C. Seawater properties are evaluated using the correlations presented by M. Sharqawy, et al., "Thermophysical properties of seawater: A review of existing correlations and data," Desalination and Water Treatment (16), pages 354-380 (2010). The curves in FIG. 2 are plotted at a recovery ratio (RR) of 50%. It is observed that by increasing the steam temperature from 90° C. to 120° C. (and correspondingly reducing $\dot{S}_{in}$ by 31.6%) the least thermal energy required is reduced by 27%. If the steam temperature can be further increased to 200° C. (correspondingly reducing $\dot{S}_{in}$ by 59%) the least thermal energy required is reduced by 50%. The specific least thermal energy consumed is represented as $\Delta\dot{H}_{in,least}/\dot{m}_{pw}$ [kJ/kg], where $\dot{H}$ is the total enthalpy rate (W).

The dehumidification process also results in heating of the liquid composition that is eventually used to irrigate the evaporator 12. The liquid composition is pumped via a pump, not shown, at a substantially constant mass flow from a source 28, which can be, for example, a tank fed by a sea, ocean, groundwater, waste pool or other body of water, through a liquid-feed conduit 30, as shown in FIG. 1, that passes through the condenser 14, wherein the liquid composition is preheated before entering the evaporator 12, thus recovering some of the energy input to the thermal vapor compressor 16 in the form of thermal energy, which is given back to the carrier gas stream in the evaporator 12. The liquid-feed conduit 30 can have a flow configuration inside the condenser 14 that will increase its surface area to allow for thermal energy transfer from the moisture-laden carrier gas (thereby driving precipitation of water from the carrier gas) through the walls of conduit 30 into the liquid composition. The water vapor in the carrier gas therefore condenses (along path 24) and is collected as substantially pure (fresh) water at the bottom of the condenser 14, e.g., in a collection tray. The collected fresh water, can then be removed from the condenser 14 to, e.g., a storage tank 29 for use, e.g., as drinking water, for watering crops, for washing/cleaning, for cooking, for industrial use, etc.

Figure 3:
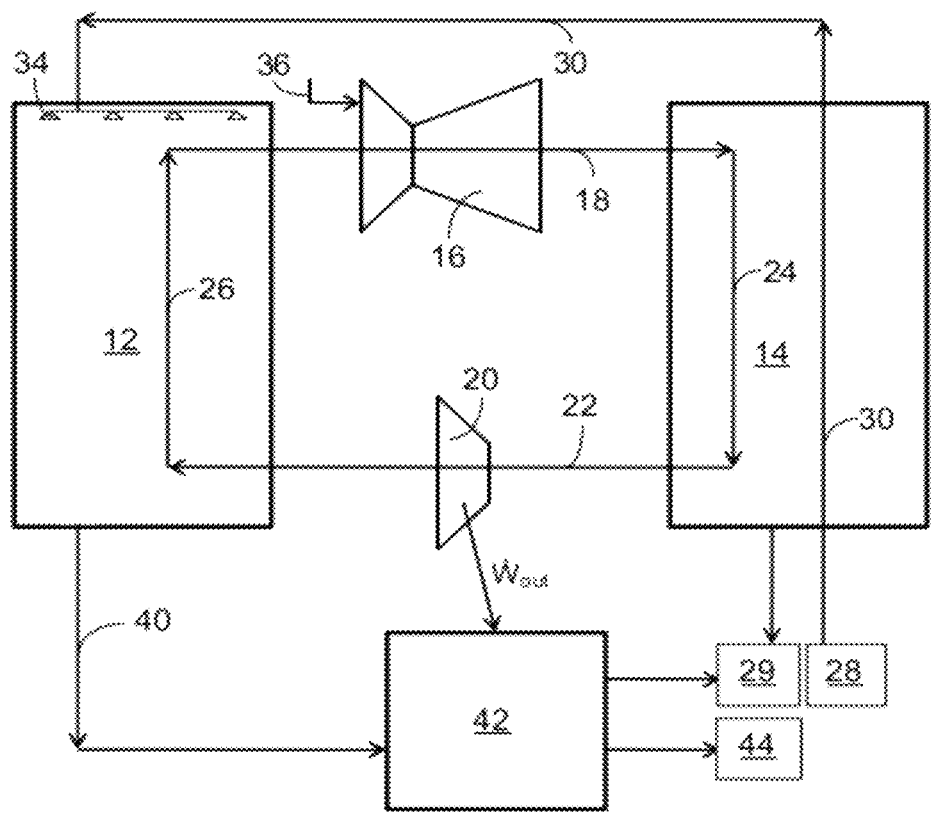
FIG. 3 is a schematic diagram of a high-temperature-and-high-pressure-steam-driven system for humidification-dehumidification desalination using a thermal vapor compressor coupled with an auxiliary water production unit.

The evaporator 12 and condenser 14 are operated at different pressures, wherein that pressure difference is maintained using the thermal vapor compressor (TVC) 16 to compress the humidified carrier gas with the steam supply and by using the expander 20 (e.g., in the form of a throttle valve, a nozzle, a turbine, a screw, a reciprocating expander, a centrifugal expander or a scroll expander) to expand the dehumidified carrier gas and recover energy in the form of work, $\dot{W}_{out}$, as shown in FIG. 1, where the recovered work can be in the form of a mechanical energy or which can be converted to electricity by a generator, can be used in an auxiliary water-purification (e.g., desalination) apparatus 42, such as a reverse osmosis unit (or a mechanical vapor-compression system or an electro-dialysis system), as shown in FIG. 3 to desalinate the brine output from conduit 40 the evaporator 12. The auxiliary water-purification apparatus 42, in turn, produces additional fresh water, which is output to the pure water storage tank 29, and a higher-concentration brine, which is output to a brine containment 44. A small amount of water can be condensed out of the carrier gas in both the thermal vapor compressor 16 and expander 20 and be collected.

Alternative water-purification apparatus that can be driven by the recovered work, $\dot{W}_{out}$, include a mechanical vapor compression system, which likewise can be driven by work in the form of a mechanical drive force or after conversion to electricity, or an electrodialysis system, which can be powered by work that has been converted to electricity. In other embodiments, the recovered work, $\dot{W}_{out}$, can be used for a variety of other applications, including pumping the carrier gas or liquid composition, providing electricity to the electrical grid, powering associated electrical components (such as sensors or controllers), or compress moist air with a mechanical compressor either upstream or downstream of the thermal vapor compressor 16 in conduit 18.

The carrier gas can operate in a closed loop and undergo the humidification process at a lower pressure and the dehumidification process at a higher pressure. The carrier gas and/or the liquid composition can also be heated in the system with a gas or liquid heater to achieve or maintain desired temperatures. The pressure ratio (i.e., the ratio of the absolute pressure in the condenser 14 to the absolute pressure in the evaporator 12) can be, for example, about 1.2. This pressure differential creates an opportunity for greater heat recovery for the following reasons: (1) the heat recovered in the condenser 14 from the carrier gas to pre-heat the liquid composition is of a higher grade (higher temperature); (2) the carrier gas itself is heated (apart from getting humidified) in the evaporator 12 by virtue of being at a lower temperature than the liquid composition; and (3) heat can be recovered as work output from the expander 20, as described herein.

A part of the compressor work can be supplied by the work, $\dot{W}_{out}$, extracted from the expansion process, for example, by coupling the expander 20 to a mechanical compressor positioned upstream from the thermal vapor compressor 16 or by using a motor-generator arrangement to transfer the work, $\dot{W}_{out}$, from the expander 20 to the thermal vapor compressor 16 to compress the injected fluid. Alternatively or additionally, the work, $\dot{W}_{out}$, extracted from the expander 20 can be used to drive a heat pump to heat the fluid injected by the thermal vapor compressor 16. Cooling of carrier gas via expansion en route to the evaporator 12 results in a lower temperature in the evaporator 12, which also improves the performance of the cycle.

Figure 4:
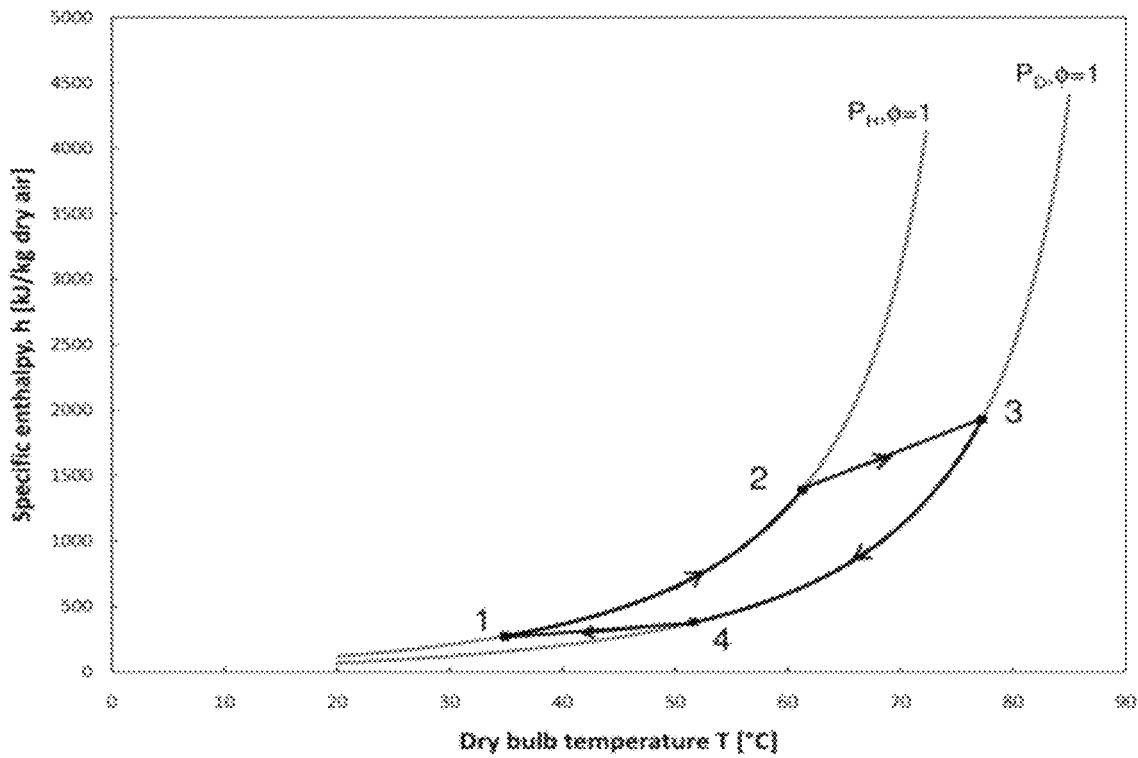
FIG. 4 is a psychometric representation of a representative embodiment of a thermal-vapor-compression-driven HDH system in accordance with this disclosure.

A psychrometric chart for an exemplary embodiment of a desalination process conducted with this apparatus and in accord with these methods is provided in FIG. 4, where air is the carrier gas, and where the pressure for dehumidification, $P_D$, in the condenser 14 is greater than the pressure for humidification, $P_H$, in the evaporator 12. Path 1-2 in FIG. 4 is the carrier-gas humidification process in the evaporator 12, wherein the process is approximated to follow the saturation line. Path 2-3 is the thermo-compression process in which the humidified carrier gas is compressed to a higher pressure and temperature in the thermal vapor compressor 16. Path 3-4 is the dehumidification process in the condenser 14, wherein this process also approximated to follow the saturation line at a higher pressure, $P_D$. Path 4-1 is the air expansion process through the expander 20, where some of the energy that was input in the compressor 16 is recovered.

High pressure and high temperature are possible because the heating steam is not brought in direct contact with the liquid composition (e.g., seawater), it is instead brought in contact with the vapor laden carrier gas. Thus, this new system can be designed such that the brine temperature does not exceed 60° C. For standard seawater concentrations, this is sufficient to avoid scale formation.

Figure 5:
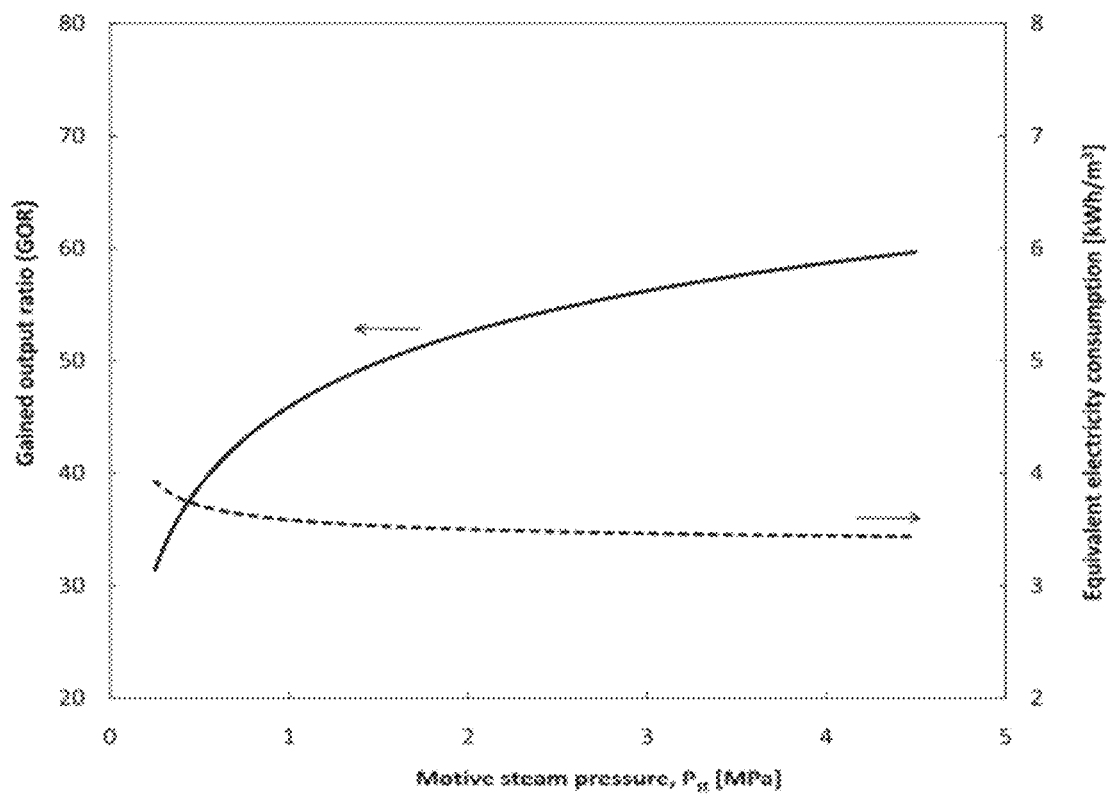
FIG. 5 is a plot of the effect of steam pressure on the performance of a representative embodiment of a thermal-vapor-compression-driven HDH system in accordance with this disclosure, wherein the gained output ratio and the equivalent electricity consumption are plotted as a function of the pressure of the steam input to the thermal vapor compressor.

In order to reduce the heat required to run a thermal desalination system, the input heating steam needs to be at a lower entropy state or of a lower mass flow rate. We will first investigate the effect of using low entropy, higher pressure (saturated) steam. FIG. 5 illustrates the increase in the Gained Output Ratio (GOR), which is the ratio of the latent heat of evaporation of the water produced to the net heat input to the cycle, and the decrease in equivalent electricity consumption when higher pressure steam is used in a simulated experiment. For this example, the component effectivenesses and efficiencies are fixed along with the operating pressures and feed seawater conditions. The air and water side pressure drops are assumed to be zero. The temperature of the incoming seawater is 30° C.; the energy based effectiveness of both the evaporator 12 and the condenser 14 is set at 80%; the isentropic efficiency of both the thermal vapor compressor 16 and the expander 20 is assumed to be 100%; the pressure in the evaporator 12 is 40 kPa; the pressure in the condenser 14 is 48 kPa; the quality of the input steam is assumed to be 1 (ideal); and the heat capacity ratio (HCR) of the evaporator is set at 1.

The strong impact that an increase in steam pressure can have on the performance of the humidification-dehumidification thermal-vapor-compressor (HDH-TVC) system can be clearly observed in FIG. 5. In this example, when the steam pressure is increased from 250 kPa to 1000 kPa (i.e., from a saturated steam temperature of 127.4° C. to 179.9° C.), the GOR is increased by 45%. Even though a higher pressure steam is used, the equivalent electricity consumption is still reduced by 9% for the aforementioned increase in steam pressure. This is because the mass flow rate of high-pressure steam extracted from the (fictious) steam turbine is small, and the corresponding work lost in the steam turbine is reduced.

Figure 6:
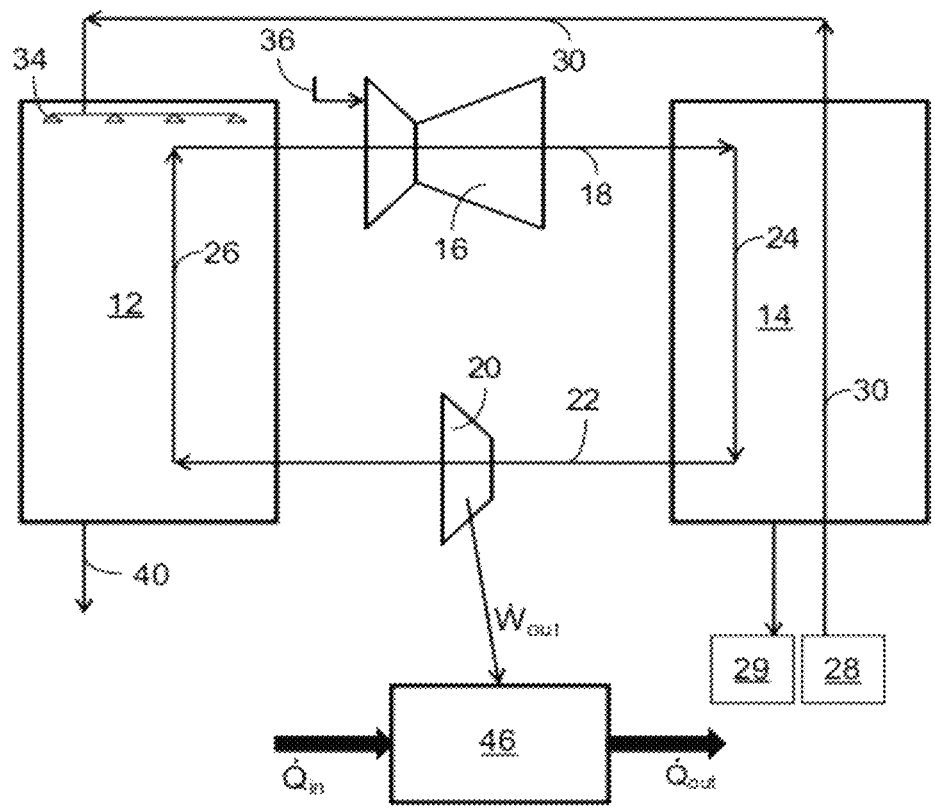
FIG. 6 is a schematic diagram of a high-temperature-and-high-pressure-steam-driven system for humidification-dehumidification desalination using a thermal vapor compressor with a heat pump.

As noted, above, the work recovered from an expander 20 can be used to drive a variety of processes within and/or outside the HDH apparatus. FIG. 6 illustrates an embodiment of the system in which the recovered work, $\dot{W}_{out}$, from the expander 20 is supplied in the form of heat energy to a heat pump 46 where the heat is recycled (a) to the superheated steam supply that is then fed into the thermal vapor compressor 16 or (b) to the steam generation unit for generating the superheated steam. In an alternative embodiment, illustrated in FIG. 7, the recovered work, $\dot{W}_{out}$, from the expander 20 is supplied to a refrigeration or air-conditioning 48 unit where the work energy extracts heat from an object to be refrigerated via a vapor compression refrigeration device.

Figure 7:
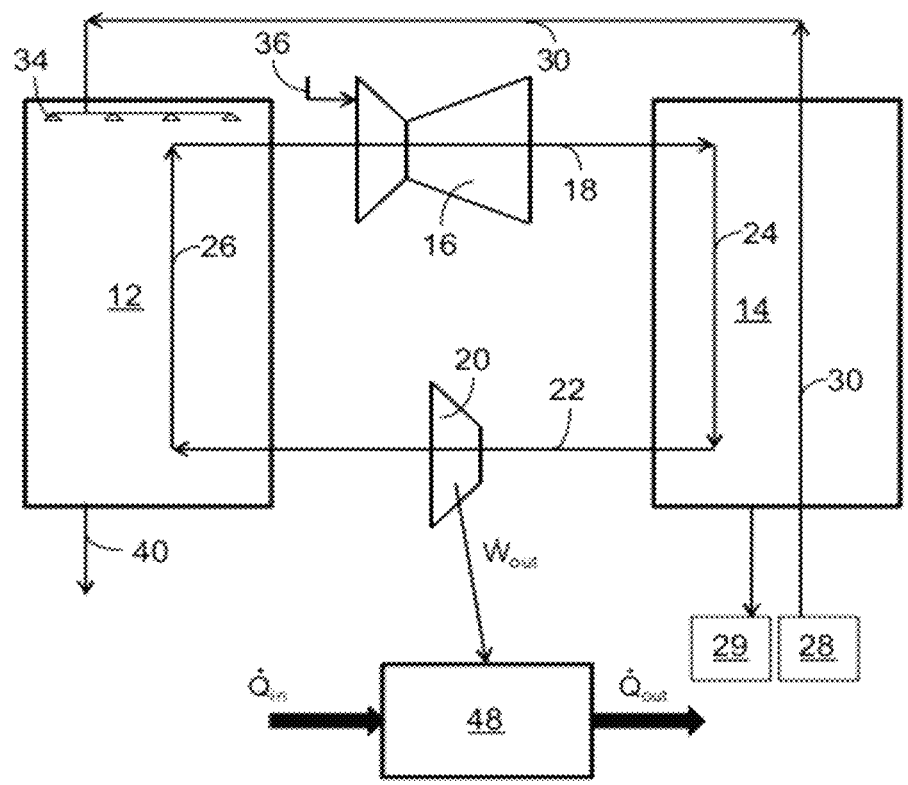
FIG. 7 is a schematic diagram of a high-temperature-and-high-pressure-steam-driven system for humidification-dehumidification desalination using a thermal vapor compressor with a refrigeration or air-conditioning unit.
Figure 8:
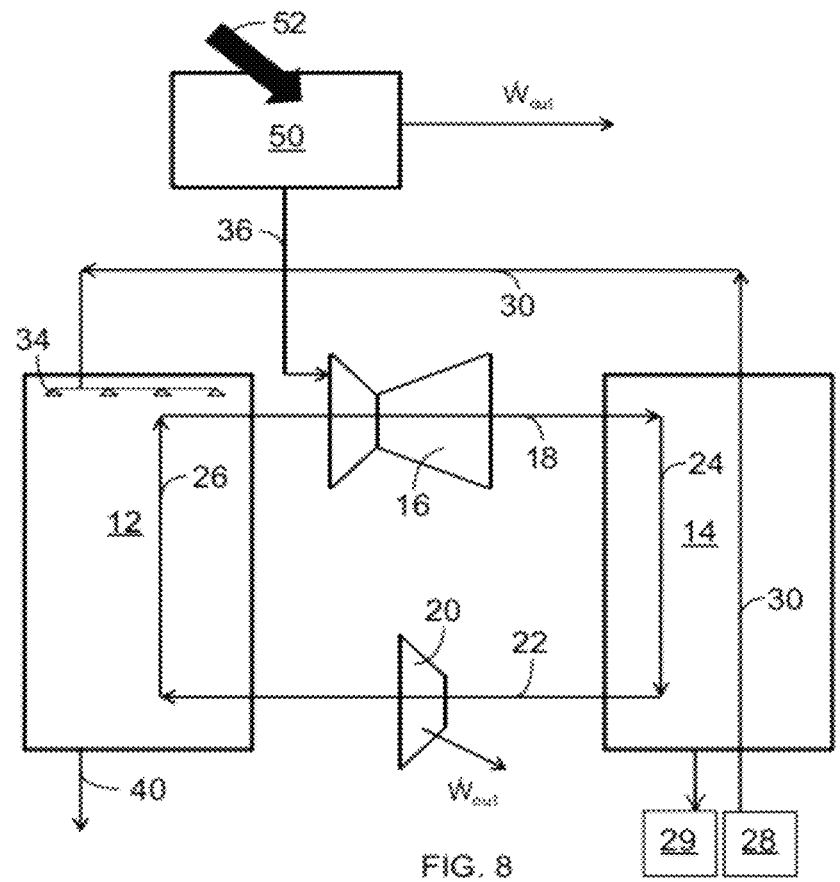
FIG. 8 is a schematic diagram of a co-production, high-temperature-and-high-pressure-steam-driven system for humidification-dehumidification desalination using a thermal vapor compressor.

An embodiment where the steam is supplied from a Rankine or combined cycle power plant 50 is illustrated in FIG. 8. In this embodiment, heat 52 is input to the power plant 50, which produces a work output, $\dot{W}_{out}$, and an output of steam 36. The output steam 36 is fed to the thermal vapor compressor 16 where it is injected as a low-entropy heat source into the carrier gas in conduit 18. This embodiment can be combined with (a) the auxiliary water purification apparatus 42 (employing, e.g., a reverse osmosis apparatus), integrated as shown in FIG. 3; (b) the heat pump 46, integrated as shown in FIG. 6; or (c) a refrigeration or air-conditioning unit, integrated as shown in FIG. 7.

Figure 9:
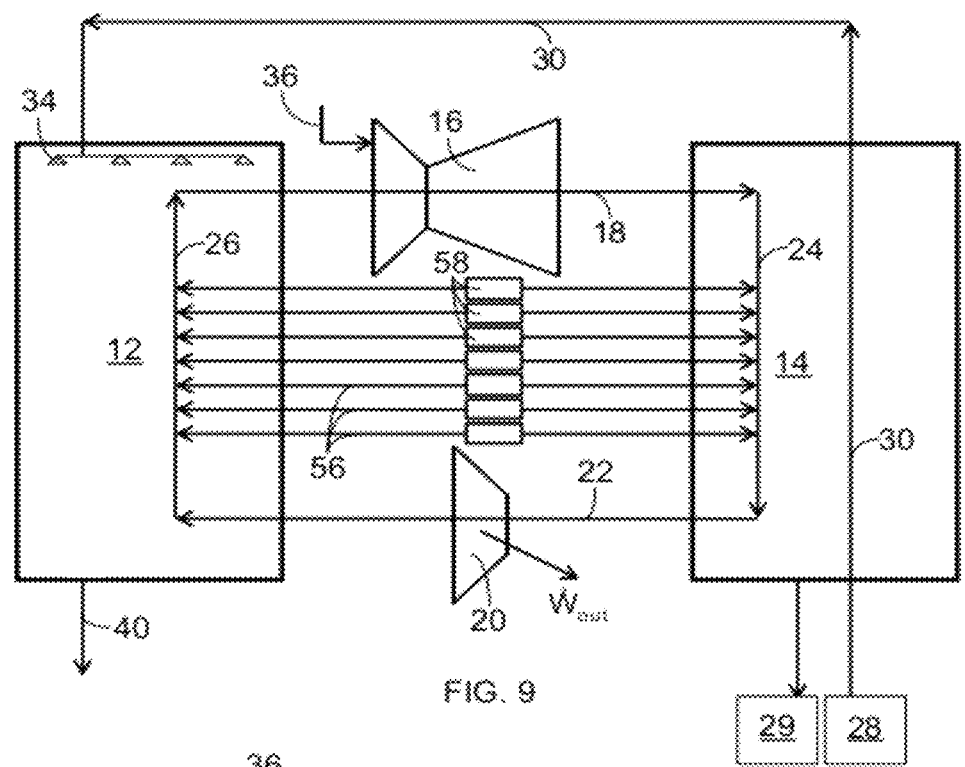
FIG. 9 is a schematic diagram of a high-temperature-and-high-pressure-steam-driven system for humidification-dehumidification desalination using a thermal vapor compressor and multiple extraction flows for the carrier gas.

FIG. 9 illustrates an embodiment of the invention that uses a multi-extraction humidification system, wherein the gas is extracted at multiple intermediate locations via intermediate conduits 56 from the evaporator 12 and/or from the condenser 14 and supplied at corresponding input locations to the condenser 14 or to the evaporator 12, respectively, facilitating reduced entropy generation in the components and, hence, higher system performance. The gas can flow through the intermediate conduits 56 naturally, or the flow can be powered by a fan in one or more of the conduits. An expansion/compression device 58 is mounted in each intermediate conduit 56 to expand gas passing through a conduit 56 from the condenser 14 to the humidifier 12 or to compress gas passing through a conduit 56 from the humidifier 12 to the condenser 14. The amount of gas extracted through an intermediate conduit 56 depends strongly on the operating temperatures, and this amount can be controlled by components, such as expanders and compressors that may be placed in the intermediate conduits 56. Providing multiple extractions can serve to essentially break up the evaporator 12 and condenser 14 into a number of smaller parts with different values of mass flow ratio and to thereby balance heat capacity rates across the evaporator 12 and/or across the condenser 14, allowing for manipulation of gas temperatures, pressures and mass flow rates.

Figure 10:
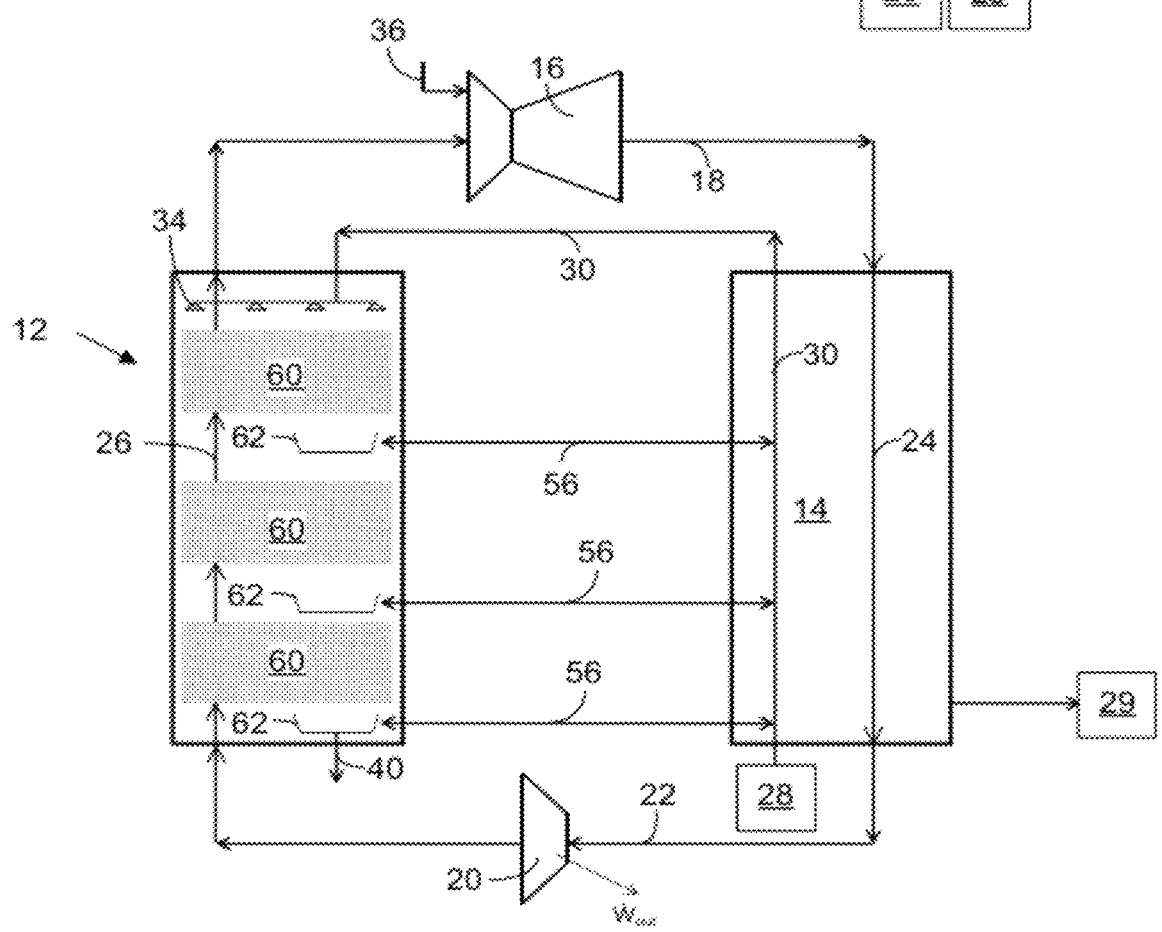
FIG. 10 is a schematic diagram of a high-temperature-and-high-pressure-steam-driven system for humidification-dehumidification desalination using a thermal vapor compressor and multiple extraction flows for the brine and liquid mixture.

In the system of FIG. 10, intermediate conduits 56 are provided for multi-extraction of the liquid composition. In this illustration, the inner and outer circuits for the liquid and gas flow in the system are reversed in comparison with the previous illustrations; this switch in configuration in FIG. 10 is made for ease of illustration of the intermediate conduits 56. In this embodiment, the packing material 60 is segregated into distinct beds separated by brine collection receptacles (e.g., trays) 62, wherein the brine collection receptacles 62 are distributed across different heights of the humidifier 12. Inside the humidifier 12, brine is collected in each of the brine collection receptacles 62. The brine can be extracted from the receptacles 62 and passed through intermediate conduits 56 to corresponding intermediate locations in the condenser, where the brine is injected into conduit 30. Alternatively, the liquid composition (e.g., seawater) can be extracted from intermediate locations in conduit 30, passed through conduits 56 and injected into corresponding brine receptacles 62 at the other ends of the conduits 56.

In describing embodiments of the invention, specific terminology is used for the sake of clarity. For the purpose of description, specific terms are intended to at least include technical and functional equivalents that operate in a similar manner to accomplish a similar result. Additionally, in some instances where a particular embodiment of the invention includes a plurality of system elements or method steps, those elements or steps may be replaced with a single element or step; likewise, a single element or step may be replaced with a plurality of elements or steps that serve the same purpose. Further, where parameters for various properties are specified herein for embodiments of the invention, those parameters can be adjusted up or down by $\frac{1}{100}^{th}$, $\frac{1}{50}^{th}$, $\frac{1}{20}^{th}$, $\frac{1}{10}^{th}$, $\frac{1}{5}^{th}$, $\frac{1}{3}^{rd}$, $\frac{1}{2}$, $\frac{3}{4}^{th}$, etc. (or up by a factor of 2, 5, 10, etc.), or by rounded-off approximations thereof, unless otherwise specified. Moreover, while this invention has been shown and described with references to particular embodiments thereof, those skilled in the art will understand that various substitutions and alterations in form and details may be made therein without departing from the scope of the invention. Further still, other aspects, functions and advantages are also within the scope of the invention; and all embodiments of the invention need not necessarily achieve all of the advantages or possess all of the characteristics described above. Additionally, steps, elements and features discussed herein in connection with one embodiment can likewise be used in conjunction with other embodiments. The contents of references, including reference texts, journal articles, patents, patent applications, etc., cited throughout the text are hereby incorporated by reference in their entirety; and appropriate components, steps, and characterizations from these references optionally may or may not be included in embodiments of this invention. Still further, the components and steps identified in the Background section are integral to this disclosure and can be used in conjunction with or substituted for components and steps described elsewhere in the disclosure within the scope of the invention. In method claims, where stages are recited in a particular order—with or without sequenced prefacing characters added for ease of reference—the stages are not to be interpreted as being temporally limited to the order in which they are recited unless otherwise specified or implied by the terms and phrasing.

What is claimed is:

1. A method for separating water from a liquid composition including water, the method comprising:
   directing a flow of a carrier gas through at least one evaporator, wherein the evaporator is operated at an evaporator pressure;
   directly contacting the carrier gas flow with the liquid composition in the evaporator to humidify the carrier gas with water evaporated from the liquid composition, producing a humidified gas flow;
   compressing the humidified gas flow by injecting a fluid from a source other than the evaporator at an elevated pressure at least five times greater than the evaporator pressure, the fluid comprising a vapor selected from at least one of the group consisting of steam and an organic compound, wherein the fluid is at a temperature at least as high as a saturation temperature of the vapor at the elevated pressure of the fluid;
   directing the compressed and humidified gas flow through at least one condenser;
   dehumidifying the compressed humidified gas flow in the condenser to condense water from the compressed humidified gas flow;
   recirculating the dehumidified gas flow from the condenser back through the evaporator, where the dehumidified gas is reused as the carrier gas; and
   collecting the water that is condensed in the condenser.

2. The method of claim 1, wherein the evaporator is operated at a sub-atmospheric pressure.

3. The method of claim 1, wherein a thermal vapor compressor uses the fluid to compress and heat the humidified gas flow.

4. The method of claim 1, wherein the fluid is steam.

5. The method of claim 4, wherein the steam is injected at a temperature above 120° C.

6. The method of claim 4, wherein the steam is from a steam turbine of a Rankine power plant or a combined cycle power plant.

7. The method of claim 1, further comprising expanding the dehumidified gas flow in an expander before the dehumidified gas flow is recirculated through the evaporator, wherein the expander produces a work output.

8. The method of claim 7, wherein the expander is selected from a throttle valve, a nozzle, a turbine, a screw, a reciprocating expander, a centrifugal expander and a scroll expander.

9. The method of claim 7, further comprising using the work output to perform at least one of the following functions: pumping the gas flow or liquid composition through the evaporator and condenser, providing electricity to an electrical grid, providing additional compression of the humidified gas flow before or after the humidified gas flow is compressed by injecting the fluid, and powering associated electrical components.

10. The method of claim 7, further comprising using the work output to drive an auxiliary water-purification apparatus.

11. The method of claim 10, further comprising:
   extracting a brine output comprising a remnant of the liquid composition after water is evaporated from the liquid composition in the evaporator;
   feeding the extracted brine output into the auxiliary water-purification apparatus; and
   producing purified water from the brine output in the auxiliary water-purification apparatus.

12. The method of claim 10, wherein the auxiliary water-purification apparatus is selected from a reverse osmosis unit, a mechanical vapor-compression system, and an electro-dialysis system.

13. The method of claim 7, further comprising using the work output to compress the fluid injected into the humidified gas flow.

14. The method of claim 7, further comprising using the work output to heat the fluid injected into the humidified gas flow.

15. The method of claim 7, further comprising using the work output to drive a refrigeration or air-conditioning unit.

16. The method of claim 7, further comprising using the work output to drive a heat pump that heats the carrier gas flow before it is fed into the condenser or the evaporator.

17. The method of claim 1, further comprising extracting the carrier gas flow from at least one intermediate location in the evaporator or in the condenser and fed from each extracted intermediate location to an input location in the condenser or in the evaporator, respectively, allowing for manipulation of gas temperatures, pressures and mass flows rates.

18. The method of claim 1, further comprising:
   passing the liquid composition through a conduit in the condenser before introducing the liquid composition into the evaporator;
   collecting brine produced from the liquid composition after evaporation of water, wherein the brine is collected in receptacles at a plurality of locations in the evaporator; and
   at least one of the following:
   a) extracting the collected brine from the receptacles and injecting the collected brine via respective intermediate conduits into the conduit in the condenser; and
   b) extracting liquid composition from the conduit in the condenser at a plurality of locations along the conduit and injecting the extracted liquid composition via respective intermediate conduits into the receptacles in which the brine is collected in the evaporator.

19. The method of claim 1, wherein the liquid composition is selected from seawater, brackish water, waste water, agricultural run-off water, rain water, and groundwater.

20. The method of claim 1, wherein the carrier gas is inert and can hold water vapor.

21. The method of claim 1, wherein the carrier gas is selected from at least one of the following gases: air, helium, nitrogen, carbon dioxide, argon, and hydrogen.

22. A method for separating water from a liquid composition including water, the method comprising:
   directing a flow of a carrier gas through at least one evaporator, wherein the evaporator is operated at an evaporator pressure;
   directly contacting the carrier gas flow with the liquid composition in the evaporator to humidify the carrier gas with water evaporated from the liquid composition, producing a humidified gas flow;
   compressing the humidified gas flow by injecting a fluid from a source other than the evaporator at an elevated pressure at least five times greater than the evaporator pressure through a thermal vapor compressor into the humidified gas flow, the fluid comprising a vapor selected from at least one of the group consisting of steam and an organic compound, wherein the fluid is at a temperature at least as high as a saturation temperature of the vapor at the elevated pressure of the fluid;

directing the compressed and humidified gas flow through at least one condenser;

dehumidifying the compressed humidified gas flow in the condenser to condense water from the compressed humidified gas flow;

expanding the compressed dehumidified gas flow in an expander, wherein the expander produces a work output;

recirculating the expanded dehumidified gas flow from the expander back through the evaporator, where the dehumidified gas is reused as the carrier gas; and collecting the water that is condensed in the condenser.

23. The method of claim 22, wherein water is condensed in at least one of the thermal vapor compressor and the expander and collected therefrom.

* * * * *